No. 888,422. PATENTED MAY 19, 1908.
E. A. CARMOUCHE.
COTTON CLEANER, FEEDER, AND SEPARATOR ELEVATOR.
APPLICATION FILED JUNE 1, 1907.

2 SHEETS—SHEET 1.

No. 888,422. PATENTED MAY 19, 1908.
E. A. CARMOUCHE.
COTTON CLEANER, FEEDER, AND SEPARATOR ELEVATOR.
APPLICATION FILED JUNE 1, 1907.

2 SHEETS—SHEET 2.

Witnesses
J. G. Hinkel
J. J. McCarthy

Inventor
Emile A. Carmouche
by Paxton, Freeman, Watson & Coit
Attorneys

UNITED STATES PATENT OFFICE.

EMILE A. CARMOUCHE, OF SHREVEPORT, LOUISIANA, ASSIGNOR OF ONE-HALF TO MAX KRUEGER, OF SAN ANTONIO, TEXAS.

COTTON CLEANER, FEEDER, AND SEPARATOR ELEVATOR.

No. 888,422.     Specification of Letters Patent.     Patented May 19, 1908.

Application filed June 1, 1907. Serial No. 376,823.

To all whom it may concern:

Be it known that I, EMILE A. CARMOUCHE, a citizen of the United States, and a resident of Shreveport, in the parish of Caddo and State of Louisiana, have invented a certain new, useful, and Improved Cotton Cleaner, Feeder, and Separator Elevator; and I do hereby declare the following to be a full, clear, and exact description, such as will enable those skilled in the art to make and use the same, reference being had to the accompanying drawings, forming a part of this specification.

The invention is designed for use with cotton gins or like machines and its object is to take the cotton directly from the wagons, bins or other places of supply, clean it and feed it directly to the gin.

The machine not only removes dirt, trash and other foreign matter and feeds the cleaned cotton to the gin evenly, but includes within itself means for elevating the cotton from the place of supply and carrying it through the cleaner to the gin, the said means including an air draft or vacuum conduit from the place of supply through the separator to the gin feed-roll and the trash discharge.

Broadly considered the device is made up of a practically air tight casing having connected to its top an inlet conduit leading to the place of supply of the cotton and connected near its bottom, a suction pipe or conduit having connected thereto a fan, pump or other suction creating device. Within the casing are regulating feeder rolls, spiked breakers and a cleaning cylinder, there being a foraminous partition between these parts and the outlet for the air drawn through the device by the suction apparatus. A discharging vacuum cylinder is placed opposite the air outlet and it is so constructed that it will receive the cotton freed from its trash and foreign matter, and discharge it directly into the gin while preventing the ingress of air through the opening through which the cotton is discharged. There are no valves or obstructions to the passage of the air from the place of cotton supply through the apparatus to the fan or analogous device.

Figure 1:
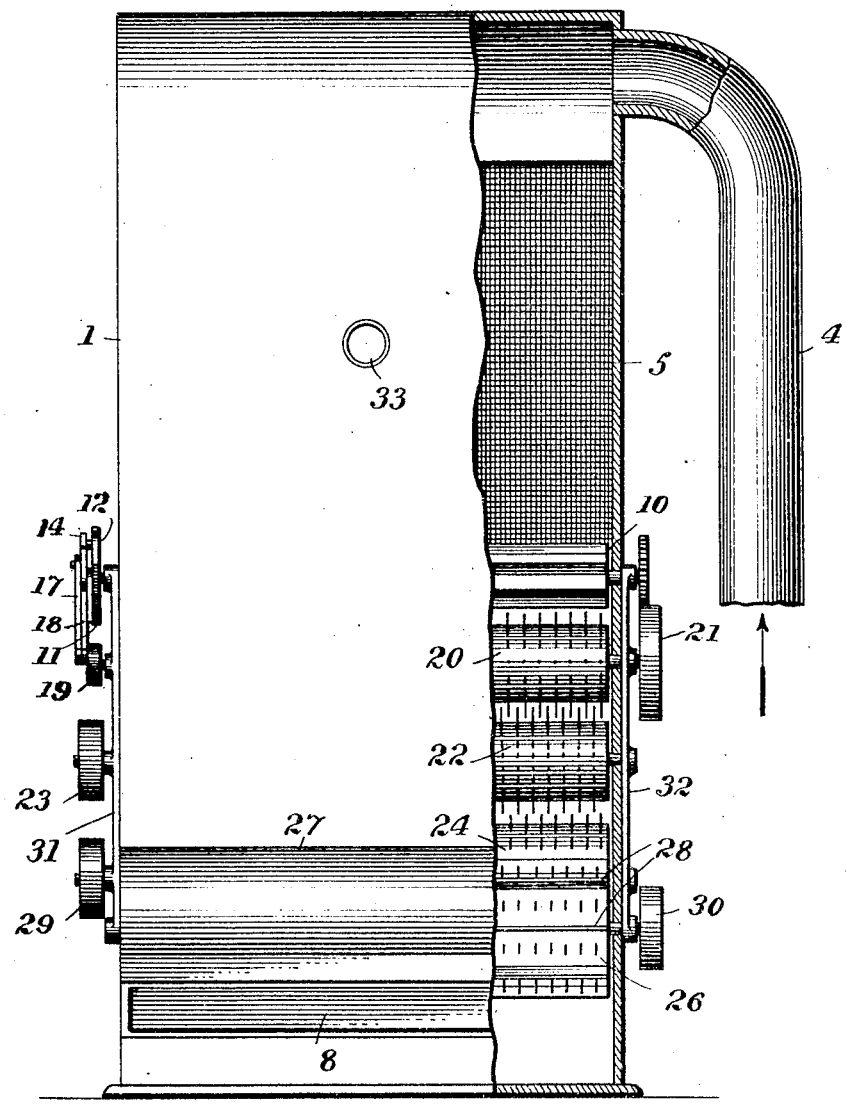
Figure 2:
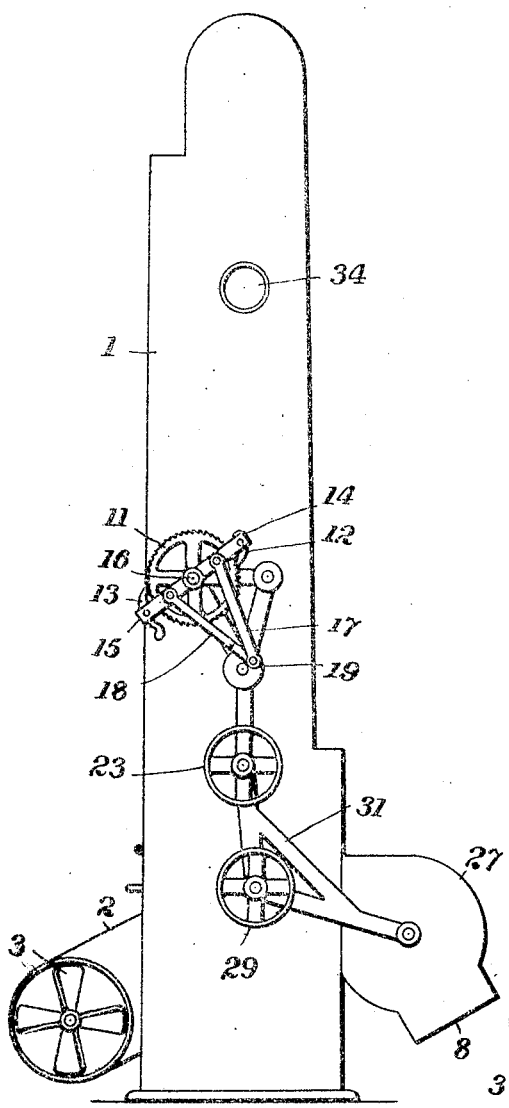
Figure 3:
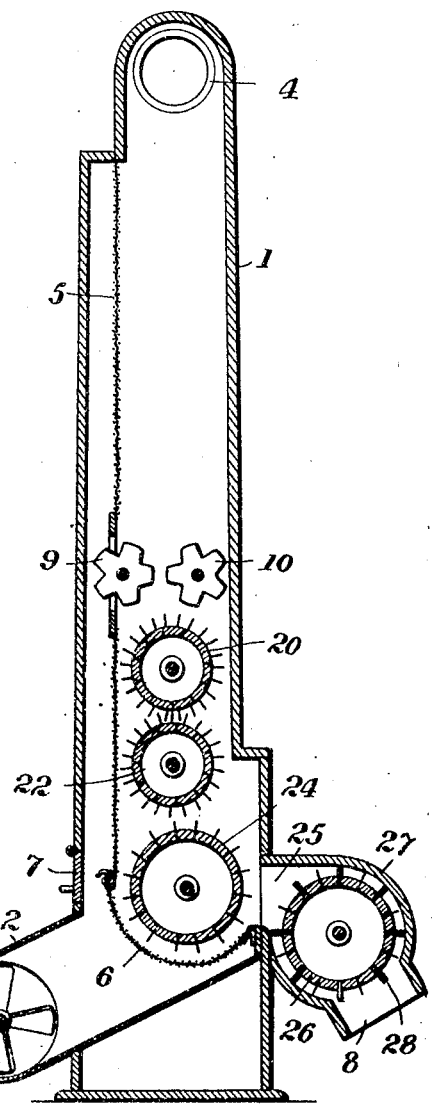

In the accompanying drawings: Figure 1 is a front view of the apparatus partly broken away so as to show the interior construction; Fig. 2 is a side view; and Fig. 3 is a cross section of Fig. 1.

In the several views of which like characters indicate like parts the main casing 1 is provided at the bottom with an outlet 2 leading to a fan or other suction device 3. A pipe or conduit 4 leads from the top to a source of cotton supply, not shown. The casing 1 as shown is wide and comparatively thin and is provided with a vertical foraminous partition 5, preferably made of wire gauze. This wire gauze partition has at its lower end a hinged section 6 which is circular in cross section, and opposite this hinged section the casing 1 is provided with a door 7 for purposes of access. Opposite the outlet 2 and on the other side of the partition is the outlet 8 which discharges the cleaned cotton directly into the gin. This discharge outlet is so shaped as to fit the feed inlet of a gin.

The corrugated regulating and retaining rolls 9 and 10 extend through the cotton receiving space and rotate in opposite directions so as to feed the cotton through the space between them to the breaker rolls beneath. The shaft of the roll 9 has upon one end the ratchet wheel 11 which ratchet wheel is driven by the pawls 12 and 13 carried by the arms 14 and 15 pivoted at 16. The arms 14 and 15 are rocked upon the pivot by the link arms 17 and 18 pivoted at 19 eccentrically upon the end of the shaft of the upper breaker. The breaker 20 is a heavy spiked roll substantially filling the space between the screen 5 and the wall of the casing and is placed directly below the feeding rollers 9 and 10. This breaker is rotated by the pulley 21 on the outside of the casing. The breaker 22 is directly below the roll 20 and is like it, being driven by pulley 23. It is advantageous to use these rolls 20 and 22, but it is not necessary.

The cleaning cylinder 24 is mounted in the enlarged lower part of the casing with its periphery in close proximity to the hinged section 6 of the screen, the said hinged section extending beneath the cylinder and to the lower edge of the aperture 25 which is opposite the cylinder. This cylinder is driven by pulley 29. The vacuum discharge roller 26 is parallel to the other rollers and is placed in a casing 27 attached to the main casing so that the aperture 25 opens directly thereinto. This casing 27 is circular in cross section, except for the inlet and outlet, and the vacuum cylinder is provided with longitudinal projections or blades 28 made of leather or analogous material which contact throughout their length with the cylindrical interior of the casing 27, thus practically preventing the passage of air into the casing 1 through the casing 27. Between the blades 28 are the spikes 29 which catch the cotton thrown against them by the cleaning cylinder 24 and deliver it through the outlet 8 to the gin, not shown. The discharge roller 26 is driven by pulley 30. The frames 31 and 32 are attached to the ends of the casing 1 for supporting the ends of the various roller shafts. The openings 33 and 34 are closed by transparent material so as to afford means for observing the feed of the cotton.

I wish it to be understood that the fan 3 is intended as a diagrammatic representation of any form of suction device placed at any point connected with the conduit 2, and I wish it to be further understood that several casings like that lettered 1 may be connected with a single suction device so that several feeders and cleaners may be operated by that one suction device.

In operation the air being drawn through the apparatus by the suction device 3 draws the cotton from the source of supply through the conduit 4 into the upper part of the casing 1 thus rendering unnecessary any separate elevating means. The air will act upon the cotton as it falls from the top of the casing to the rollers 9 and 10 and will carry off a part of the dust and trash through the screen 5 which extends to the top. The rolls 9 and 10 regulate the feed of the cotton between them and their speed of rotation may be controlled as desired. This may be done by varying the throw of the pawls.

The rolls 20 and 21 break the bolls, leaves and similar things fed in with the cotton and the roll 20 preferably rotates at a speed of 150 to 175 revolutions per minute.

The rolls 22 and 24 preferably rotate at a speed of 375 to 400 revolutions per minute, while the discharge roll 26 rotates at a speed of 20. The trash and foreign matter separated from the cotton will be carried off by the air current through the conduit 2. Nails, sticks and other things which are too large to pass through the screen 5 or are too heavy to be drawn through will fall to the bottom and rest upon the curved portion 6. Access is had for removing these through the door 7 and the hinged connection of the section 6.

It will be noted that the cotton is under the influence of the air current from the time that it is taken from the source of supply until it has passed through the breakers and cleaner and is freed from that influence only as it is taken by the discharge roll 26 and delivered into the gin.

What I claim is:

1. The combination in a cotton cleaner, of a substantially air tight casing divided by an upwardly extending foraminous partition, a pneumatic supply conduit leading to the top of said casing upon one side of the partition, cotton cleaning rollers below the supply conduit and in proximity to said partition, a discharge conduit for the cotton below the cleaning devices, means in said conduit for delivering the cotton and preventing ingress of air, an outlet for air and trash on the opposite side of said foraminous partition, and means connected to said outlet for drawing air through the device.

2. The combination in a cotton cleaner, of a casing forming a thin vertical chamber, a vertical foraminous partition therein, an inlet for cotton at the top on one side of the partition, feed rollers below the inlet, a cleaning roller below the feed rollers substantially filling the space between the foraminous partition and the wall of the casing, a discharge roller at one side of the casing adapted to receive the cotton from the cleaning roller and discharge it directly into the gin, a curved foraminous section hinged at the lower edge of the discharge outlet and extending down and around the cleaning roller and attached to the lower end of the foraminous partition, and a suction device connected to the casing below the cleaning roller.

3. In a device of the class described, the combination with a substantially air tight casing divided by a vertical foraminous partition, of a pneumatic supply conduit communicating with said casing on one side of said partition at the top, cotton cleaning and separating rolls below the inlet of said supply conduit in close proximity to said partition above its bottom, a vacuum discharge roll below said cleaning mechanism, and a suction device connected to the lower part of said casing upon the opposite side of the partition, the said supply conduit, casing and suction device being free from valves.

4. The combination in a cotton cleaner of a casing forming a thin vertical chamber, a vertical foraminous partition therein, an inlet for cotton at the top on one side of the partition, a breaking roller some distance below the top of the casing, a second breaking roller below the first and in close proximity thereto geared to run at a higher rate of speed, a cleaning roller below the said breaking rollers, each of said rollers nearly filling the space between the foraminous partition and the wall of the casing, an outlet for cotton adjacent said cleaning roller, and a connection for a suction creating device in the lower part of the casing upon the opposite side of the partition.

5. The combination in a cotton cleaner of a casing forming a thin vertical chamber, a vertical foraminous partition therein, an inlet for cotton at the top on one side of the partition, a breaking roller some distance below the top of the casing, a second breaking roller below the first and in close proximity thereto, a cleaning roller below the said breaking rollers, each of said rollers nearly filling the space between the foraminous partition and the wall of the casing, a vacuum discharge outlet for cotton adjacent said cleaning roller, and a connection for a suction creating device in the lower part of the casing upon the opposite side of the partition said parts being free from valves.

6. In a device of the class described, the combination with a substantially air tight casing, of a pneumatic supply conduit leading to the upper part of said casing, an outlet from the lower part of the casing leading to a pneumatic suction creating device, a vertical foraminous partition between the inlet and outlet having a curved lower portion joining the side wall below the outlet, cleaning rolls adjacent said partition above its bottom a vacuum discharge roll at the lower part of the casing, and a cleaning roller adjacent the discharge roll and above the curved section of the partition, the said parts being free from valves.

7. In a device of the class described, the combination with a substantially air tight casing, of a pneumatic supply conduit leading to the upper part of the casing, an outlet from the lower part of the casing leading to a pneumatic suction creating device, a vertical foraminous partition between the inlet and outlet, feed rollers, all said rollers being adjacent the vertical foraminous partition adapted to receive the cotton from the supply conduit, crushing and separating rolls below the feed rollers, and a vacuum discharge roll for delivering the cleaned cotton directly to the gin freed from the influence of the air current within the casing.

8. The combination in a cotton cleaner of a thin, wide and high casing, a vertical foraminous partition extending the length and substantially the height of the casing, a suction device connected to the casing on one side of the partition, feed rollers some distance from the top of the casing on the other side of the partition, crushing and cleaning rolls in substantially a vertical line below the feed rollers, and means for delivering the cleaned cotton.

9. The combination in a cotton cleaner of a casing having considerable height divided by a vertical foraminous partition, an inlet for cotton at the top on one side of the partition, feed rollers some distance below the inlet, breaking rollers below the feed rollers, a cleaning roller below the breaking roller, all said rollers being in close proximity to the vertical foraminous partition, a discharge roller in proximity to the cleaning roller adapted to discharge the cleaned cotton and a suction device connected with the casing on the opposite side of the foraminous partition.

10. The combination in a cotton cleaner of a casing having considerable height divided by a vertical foraminous partition, an inlet for cotton at the top on one side of the partition, feed rollers some distance below the inlet, breaking rollers below the feed rollers, a cleaning roller below the breaking roller, a curved section of the foraminous partition in proximity to and below the cleaning roller, a discharge roller in proximity to the cleaning roller adapted to discharge the cleaned cotton, and a suction device connected with the casing on the opposite side of the foraminous partition.

11. The combination in a cotton cleaner, of a casing having considerable height divided by a vertical foraminous partition, an inlet for cotton at the top on one side of the partition, feed rollers some distance below the inlet, breaking rollers below the feed rollers, a cleaning roller below the breaking roller, a curved section of the foraminous partition in proximity to and below the cleaning roller, a discharge roller in proximity to the cleaning roller adapted to discharge the cleaned cotton, and a suction device connected with the casing on the opposite side of the foraminous partition at a point below the cleaning roller.

12. In a vacuum discharge device the combination of a cylinder having lengthwise thereof continuous ribs or projections, spikes between said ribs, a cylindrical casing surrounding said cylinder and making contact with the outer edges of the ribs, an inlet opening on one side of the cylinder, and an outlet opening on the other side.

In testimony whereof I affix my signature in presence of two witnesses.

EMILE A. CARMOUCHE.

Witnesses:
G. C. COROTHERS,
JARED J. LISSNER.